United States Patent [19]

Adams

[11] 4,391,289
[45] Jul. 5, 1983

[54] CHECK VALVE FOR ROD OUT

[76] Inventor: Donald L. Adams, P.O. Box T, Tulia, Tex. 79088

[21] Appl. No.: 264,578

[22] Filed: May 18, 1981

[51] Int. Cl.³ .......................... B08B 1/02; F16K 51/00
[52] U.S. Cl. .................................... 137/15; 73/861.53; 73/756; 15/104.16; 137/244; 137/245.5; 137/315; 137/DIG. 2
[58] Field of Search ...................... 137/15, 244, 245.5, 137/315, 522, 539.5, DIG. 2; 15/104.16; 73/205 R, 756; 251/149.6, 330, 82, 83, 293, 318

[56] References Cited

U.S. PATENT DOCUMENTS

| | | | |
|---|---|---|---|
| 543,773 | 7/1895 | Massey | 137/539.5 |
| 837,035 | 11/1906 | Butler | 137/245.5 |
| 1,069,013 | 7/1913 | Hinckley | 137/245.5 |
| 1,467,492 | 9/1923 | Olson | 137/245.5 |
| 2,068,102 | 1/1937 | Gaines | 137/245.5 |
| 3,893,651 | 7/1975 | Uecker | 251/82 |
| 4,070,239 | 1/1978 | Bevilacqua | 251/82 |
| 4,076,043 | 2/1978 | Rogan | 137/539.5 |
| 4,192,342 | 3/1980 | Adams | 137/245.5 |

*Primary Examiner*—George L. Walton
*Attorney, Agent, or Firm*—Wendell Coffee

[57] ABSTRACT

A ball check valve connects to a duct leading from a process pipe to a flow transmitter, pressure gauge or sampling analyzer. A unique check valve is connected to the distal end of the straight-through duct. A cleaning rod impales a packing gland which is connected onto the check valve when cleaning is initiated. The cleaning rod is inserted through the check valve and into the duct to clean debris without the loss of any fluid while maintaining full process pressure.

14 Claims, 9 Drawing Figures

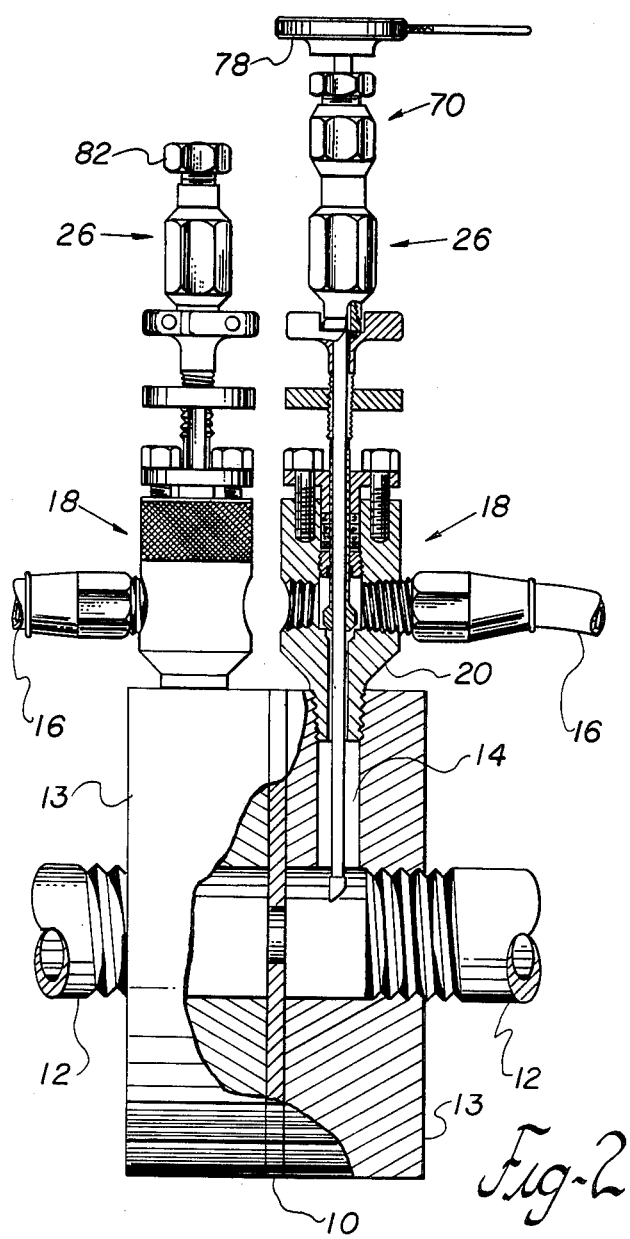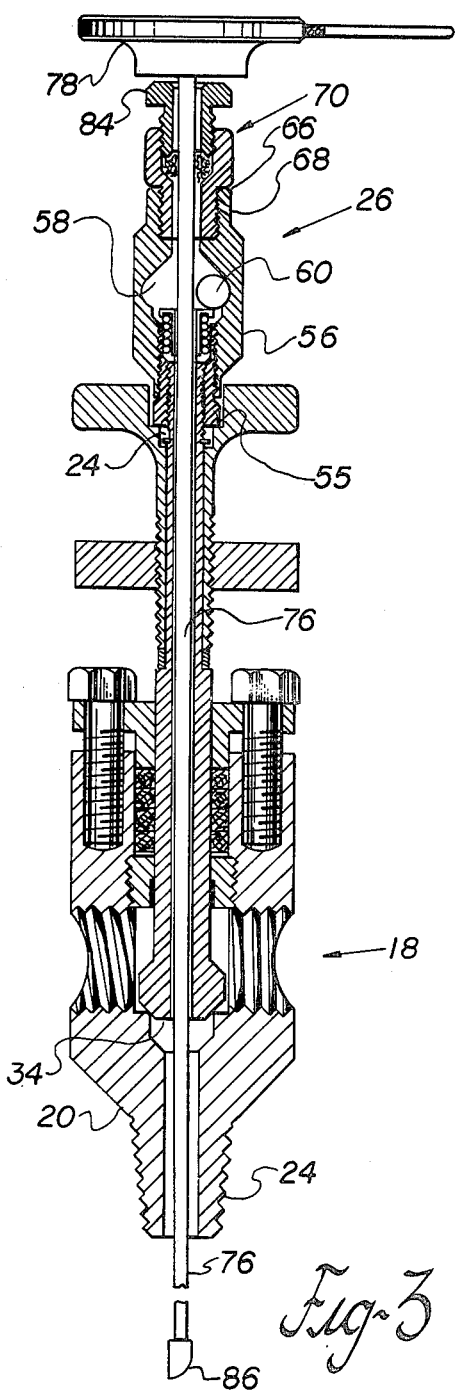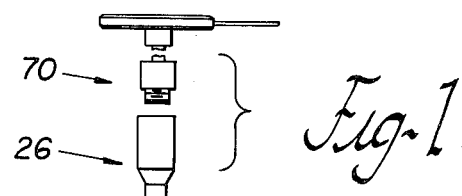

CHECK VALVE FOR ROD OUT

BACKGROUND OF THE INVENTION (1) Field of the Invention

This invention relates to cleaning valves in fluid handling systems and more particularly to an independently actuated reciprocating rod.

(2) Description of the Prior Art

Flow transmitters and flow measuring devices are often connected by valves to process pipes. Foreign matter and debris periodically block the duct connecting these valves to the conduit. This debris could be a waxy substance: tars, coke, pulp, powders from slurries, etc. My U.S. Pat. No. 4,192,342 shows the telescoping of a cleaning rod within a hollow stem and forcing the rod through the duct to clean debris. That patent discloses a permanent cleaning rod to be used in every duct which requires cleaning. This is expensive in large process plants. In addition the telescoped rod may be unexpectedly unscrewed, allowing the loss of the fore end of the tool and consequent release of process fluid when the remaining rod-out tool is withdrawn.

SUMMARY OF THE INVENTION (1) New and Different Function

According to this invention, the problems and disadvantages of the prior art have been eliminated. A special check valve is connected onto the duct to be cleaned. A special tool is provided which has a packing gland with a clean out rod through the gland. The gland is attached (as by screwing) onto the distal end of the special check valve on the duct.

The special clean out tool will push aside the ball valve of the special check valve and pass through the special check valve into the duct to be cleaned. The cleaning rod may then be operated to clear debris from the duct.

The ball in the check valve is positioned on its seat by a slotted guide biased by a coil spring when the valve is closed. The cleaning rod has a slanted or beveled end which aids the unseating of the check valve and insertion of the rod. The beveled end also aids in cutting through clogging debris.

Use of the packing gland and check valve eliminates the expense of a permanent cleaning rod at each duct yet provides for removal of debris from the duct without stopping the processing unit. A bleed port at the distal end of the check valve permits fluid to be vented away from the operator should the ball not be seated as the packing gland is being removed.

Thus I have provided the only system known that allows to rod-out without blocking process pressure and spilling fluid to connect a rod-out tool.

It may be seen that the function of the combination of my invention is far greater than the sum of the functions of the individual parts such as the rod, ball, packing, seat, spring, etc.

(2) Objects of the Invention

An object of this invention is to clean debris from a valve or duct.

Another object of this invention is to provide a check valve for insertion of a rodding and cleaning tool into a duct connecting a processing line and measuring device.

A further object is to produce a valve upon which all routine maintenance may be performed without interrupting the fluid flow.

Further objects are to achieve the above with a device that is sturdy, compact, durable, lightweight, simple, safe, efficient, versatile, ecologically compatible, energy conserving, and reliable, yet inexpensive and easy to manufacture, install, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a schematic representation of the invention.

FIG. 2 is a side elevational view with some parts in section of this invention as embodied in a typical thin plate orifice flow rate measuring system.

FIG. 3 is a sectional view of this invention with a valve.

DESCRIPTION OF THE PREFERRED EMBODIMENT

Figure 4:
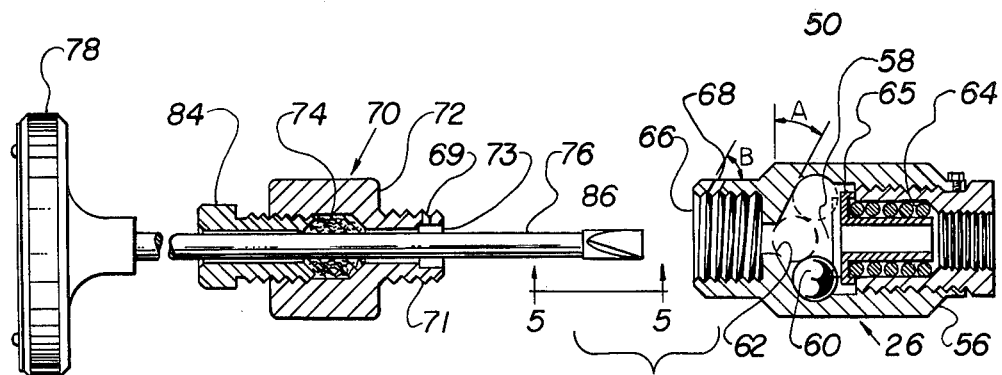
FIG. 4 is an axial sectional view of the check valve, packing gland and rod.
Figure 8:
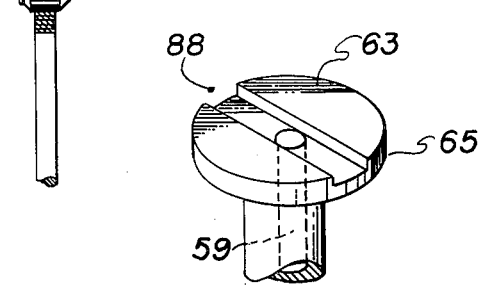
FIG. 8 is a partial perspective of the slotted, springbiased guide.
Figure 9:
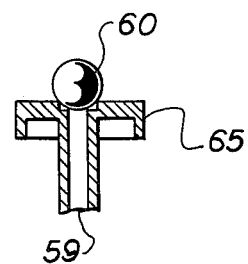
FIG. 9 is an axial sectional view of the guide with the ball thereon.

Process lines, such as line 12, typically have places where testing, including sampling and pressure measurement is done. A general installation has duct 14 extending into opening 15 in the line 12. The flow through the duct is controlled by a main valve 18 so that line 16 can be pressurized or have samples flowing through it as desired. The duct 14 and the opening 15 where the duct 14 receives fluids from the line 12 often becomes clogged. The purposes of this invention, as set out above, is to clear the debris from the duct 14 and the opening 15. Basically this is performed by placing special check valve 26 on the distal end of the duct 14, so that special packing glands 70 can be attached thereto.

Referring particularly to FIGS. 2 and 3, orifice plate 10 is in the process line 12 between two flanges 13. The duct 14 within flange 13 is open to process line 12. The valve 18 controls the flow of fluid to the sample line 16. The valve 18 has valve body 20 threaded into the duct 14 at threaded outlet 24.

In installations such as those shown in FIG. 2, valves are placed very close to one another so that it is important for the installation and removal that the diameter of the valves be at a minimum and no part of the valves may exceed this diameter. Valve 18 is shown with two outlets 21 wherein one outlet is closed by plug and the other outlet has sample line 16 threaded into it.

The valve 18 controls the flow of fluid to be tested. The valve 18 has a hollow valve stem 34 which is aligned with the duct 14.

It will be understood that the valve 18 is completely disclosed in my U.S. Pat. No. 4,192,342.

Threaded bushing 55 has internal tapered pipe threads threaded onto end of valve stem 34. The bushing 55 has external tapered pipe threads which thread into check valve body 56 of the check valve 26. The check valve body 56 is of lesser outer diameter than the valve body 20. Fluid from the duct 14 may flow through the hollow valve stem 34 and into check fluid chamber 58 of the check valve 26 where the fluid is blocked by ball 60 which fits against the check valve seat 62 (FIG. 4).

The check fluid chamber is tapered toward check seat 62 by an angle which is about 30° as represented by angle "A" in FIG. 4. The ball is guided to the seat by the taper when pushed by tubulor guide 65, biased by helical compression or coil spring 64. The chamber 58 is about as wide as three diameters of the ball 60 so that the ball may be totally displaced from the path of rod 76 when inserted.

The guide 65 has slotted head 63. The tubular guide 65 has bore 59 extending through it. The ball has a tendency to be held within the opening of the bore 59. Therefore, slot 88 is cut through the head 63 of the guide 65. Therefore, the ball rides in the slot and is easily moved to one side by the rod 76.

Packing gland 70 is on the rod 76 to be threaded into distal passageway 66 of check valve 26 which is aligned with the hollow valve stem 34, and the duct 14. The packing gland 70 comprises gland body 72 with central hollow passageway 73. Packing 74 is compressed by follower 84, so no fluid escapes between the rod 76 and the body 72. The packing gland is attached by the threaded end 71 into the distal passageway 66 when in use.

The check valve distal passageway 66 has a safety feature added to it. Gland threaded end 71 allows the packing gland to be threaded onto the distal end of check valve 26. Whenever the gland 70 is unthreaded from the check valve 26, bleed port 68, which is at an angle of about 60° to valve body 56 as represented by angle "B" in FIG. 4, will allow any pressurized fluid to escape away from the outlet and away from an operator, i.e. toward process line 12. Such pressurized fluid would persist only if ball 60 were not properly seated on valve seat 62. Bleed port 69 in the gland threaded end 71 permits fluid to flow to the bleed port 68. It will be understood, there will be a certain amount of trapped fluid between a well seated ball 62 and the packing 74.

Figure 5:
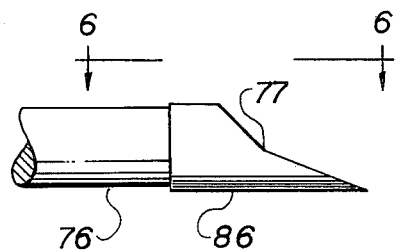
FIG. 5 is a side elevational view of the end of the rod as seen from line 5—5 of FIG. 4.
Figure 6:
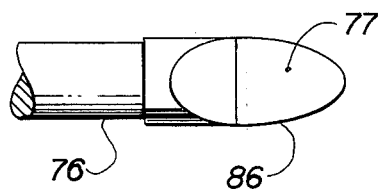
FIG. 6 is a front elevational view of the end of the rod as seen from line 6—6 of FIG. 5.
Figure 7:
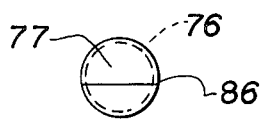
FIG. 7 is an end view of the end of the rod.

Thus it can be seen that the rod 76 extending through the packing gland 70 may be inserted into the check valve 26. One end of the rod 76 is beveled at 77 partly at 45° and partly at 20° as shown in FIG. 5 so that the operator easily unseats the ball 60 in the check valve 26. Opposite the bevel 77 the rod 76 has rod handle 78 which is circular in shape to assist the operator in pushing the rod all the way through the duct 14.

Whenever the duct 14 is to be cleaned, the rod 76 is inserted through the check valve 26 and through the length of the duct 14.

The side bevel 77 on the rod aids in the removing of debris. The bevel 77 has enlarged head 86 surrounding it.

The procedure for operation is basically as follows: first, plug 82 is removed from the threaded distal end 66 of the check valve 26. Then the packing gland 70, with the rod 76 fully retracted, is attached to the check valve 26. Then pressure on the handle 78, inserts the head 86 through the check valve pushing the ball 60 to one side. The ball rolls easily along the slot 88 in the top of the head 63 of the spring guide biased 65. Continued insertion of the rod 76 causes the beveled 77 to extend through the duct 14 cleaning any debris from it and also particularly cleaning any debris from the opening 15 from the vessel or line 12.

Once the duct and opening are cleaned, then the rod is fully withdrawn. Because the head 86 is of larger diameter than the remainder of the rod 76, it is impossible to pull the head into the passageway 73 of the packing gland 70. Therefore, the rod cannot be pulled past the packing 74 so that at all times the packing 74 will prevent fluids from leaking from the process line 12. When the rod 76 is fully retracted the helical coil spring 64 will bias the guide 65 to cause the ball 60 to roll along the slot 88 to again be seated upon the valve seat 62.

Then the operator can begin removing the packing gland 70. Should, through inadvertance, or inattention, the operator forgets to withdraw the rod from the check valve so that the ball 60 is not properly seated, as soon as he begins to loosen the gland 70, there will be a persistent fluid flow from the bleed port 69 and 68. This persistent flow will be directed in a direction away from the operator, but still it will be something that he will definitely observe. This will remind him, to remove the rod from the check valve so the ball seats. If the rod is removed and the valve still has not seated, he can jiggle the rod some to cause the ball 60 to seat. Should it be impossible to stop the flow through the bleed port 68, of course the operator can tighten the packing gland 70 upon the check valve so proper maintenance procedures can be made. In any event, there is a reduced likelihood of having the packing gland blown loose from the check valve by the pressure within the process line 12.

Once the packing glad 70 is removed, then the plug 82 may be replaced into the distal passageway 66. The rod and packing gland are thereby eliminated as a permanent fixture of each testing station in the process line 12.

Thus it may be seen that I have provided a safe, efficient, inexpensive manner to quickly clean debris from ducts and their openings.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| | |
|---|---|
| 10 orifice plate | 64 helical compression spring |
| 12 process line | 65 guide |
| 13 flanges | 66 distal passageway |
| 14 duct | 68 bleed port |
| 15 opening | 69 bleed port |
| 16 sample line | 70 packing gland |
| 18 valve | 71 gland threaded end |
| 20 valve body | 72 gland body |
| 24 threaded outlet | 73 hollow passageway |
| 26 check valve | 74 packing |
| 34 hollow valve stem | 76 rod |
| 55 threaded bushing | 77 side bevel |

| | |
|---|---|
| 56 check valve body | 78 rod handle |
| 58 check fluid chamber | 82 plug |
| 59 bore | 84 follower |
| 60 ball | 86 head |
| 62 check valve seat | 88 slot |
| 63 slotted head | |

I claim as my invention:

1. The process involving an opening such as a nozzle with a duct extending to the opening with the duct being closed by a main valve, wherein the improved method comprises:
   a. cleaning debris from the duct and the opening below the main valve by
   b. inserting a rod through a check valve on the distal end of the duct, through the main valve while the main valve is closed and through the duct,
   c. opening and unseating the check valve with said rod,
   d. mounting a packing gland upon said rod, and
   e. attaching said packing gland to the check valve before inserting the rod through the check valve and before unseating the check valve.

2. The invention as defined in claim 1 further comprising:
   f. after cleaning the debris, then
   g. withdrawing the rod from the check valve, then
   h. bleeding any pressure which may be found between the check valve and packing gland, and then mechanically
   i. disconnecting the packing gland from the check valve.

3. The invention as defined in claim 2 wherein said unseating step is performed by
   j. pushing a ball of the check valve to one side by a side bevel on the end of the rod.

4. In an opening such as a nozzle with a duct extending to the opening with the duct being closed by a main valve the improved structure for cleaning debris from the duct and opening comprising in combination with the above:
   a. a check valve on said duct at the distal end having
      (i) a check valve body with
      (ii) a check fluid chamber aligned with the duct,
      (iii) a check valve seat connecting the check chamber with
      (iv) a distal passageway aligned with the duct,
      (v) a ball in the check chamber, and
      (vi) a helical compression spring in the check chamber biasing the ball against the check valve seat,
   b. a cleaning rod is inserted through the check valve, through the main valve while the main valve is closed and through said duct,
   c. a side bevel on the end of the rod forming means for
      (i) pushing the ball of the check valve to one side and
      (ii) removing debris in the duct below the main valve,
   d. a bleed port in the distal passageway of the check valve.

5. The invention as defined in claim 4 further comprising:
   e. the check fluid chamber is about three times the diameter of the ball.

6. The invention as defined in claim 4 further comprising:
   e. the check fluid chamber is tapered toward the check seat so that the ball is guided to the seat when pushed by the spring.

7. The invention as defined in claim 6 further comprising:
   f. said taper toward the check seat being 30°.

8. In an opening such as a nozzle with a duct extending to the opening with the duct being closed by a main valve the improved structure for cleaning debris from the duct and opening comprising in combination with the above:
   a. a check valve on said duct at the distal end having
      (i) a check valve body with
      (ii) a check fluid chamber aligned with the duct,
      (iii) a check valve seat connecting the check chamber with
      (iv) a distal passageway aligned with the duct,
      (v) a ball in the check chamber, and
      (vi) a helical compression spring in the check chamber biasing the ball against the check valve seat,
   b. a cleaning rod is inserted through the check valve, through the main valve while the main valve is closed and through said duct,
   c. a side bevel on the end of the rod forming means for
      (i) pushing the ball of the check valve to one side and
      (ii) removing debris in the duct below the main valve,
   d. the check fluid chamber is sufficiently wide so that the ball may move free of the path of a rod extending through the distal passageway, check seat, check chamber, and duct,
   e. a packing gland connected onto the rod and threaded into the distal passageway of the check valve and having packing to form a seal between the distal passageway and rod.

9. The invention as defined in claim 8 further comprising:
   f. the check fluid chamber is about three times the diameter of the ball.

10. The invention as defined in claim 9 further comprising:
    g. the check fluid chamber is tapered toward the check seat so that the ball is guided to the seat when pushed by the spring.

11. The invention as defined in claim 10 further comprising:
    h. a guide between the helical compression spring and the ball,
    i. a head on the guide,
    j. a slot on head,
    k. said ball on the slot.

12. The invention as defined in claim 11 further comprising:
    m. a bleed port in the distal passageway of the check valve.

13. The invention as defined in claim 12 further comprising:
    n. a head on the rod adjacent to a bevel end for retaining the packing gland on the rod.

14. The invention as defined in claim 13 further comprising:
    o. said taper toward the check seat being about 30°.

* * * * *